Oct. 31, 1967  J. R. KIRK  3,350,046
SEAT SLIDE ASSEMBLY FOR AUTOMOTIVE VEHICLES
Filed Dec. 28, 1965  3 Sheets-Sheet 1
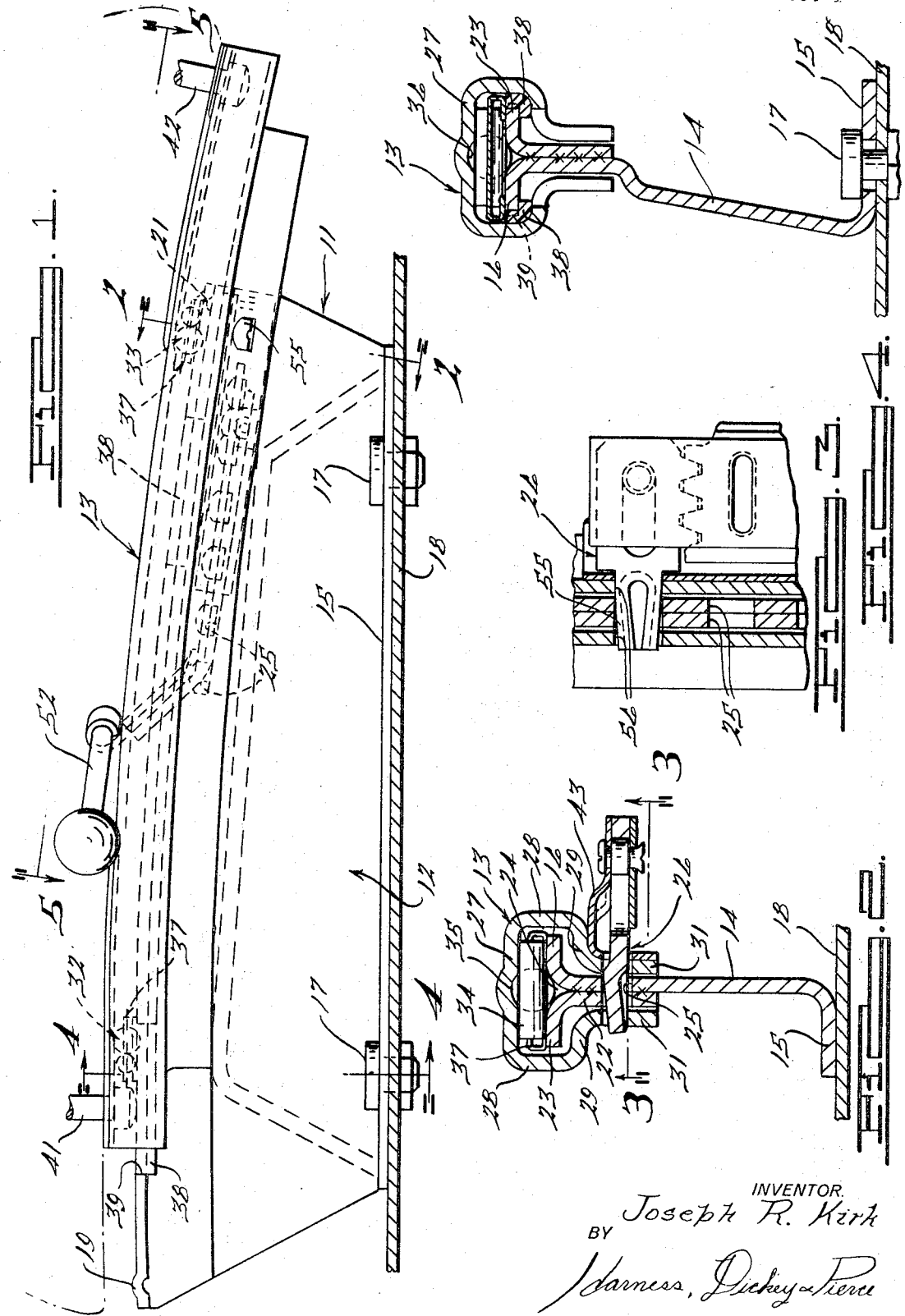
INVENTOR.
Joseph R. Kirk
BY
Harness, Dickey & Pierce
ATTORNEYS.

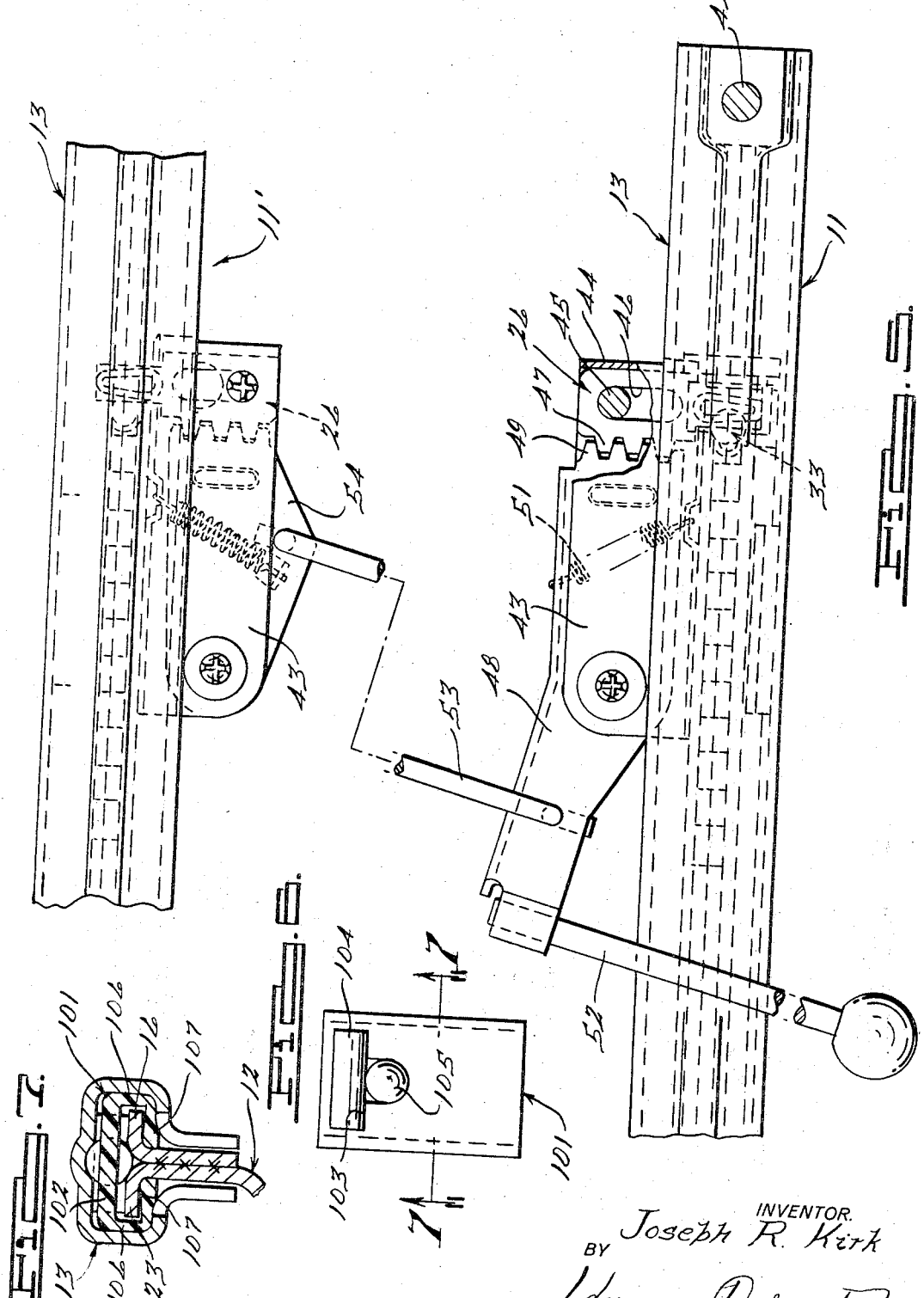

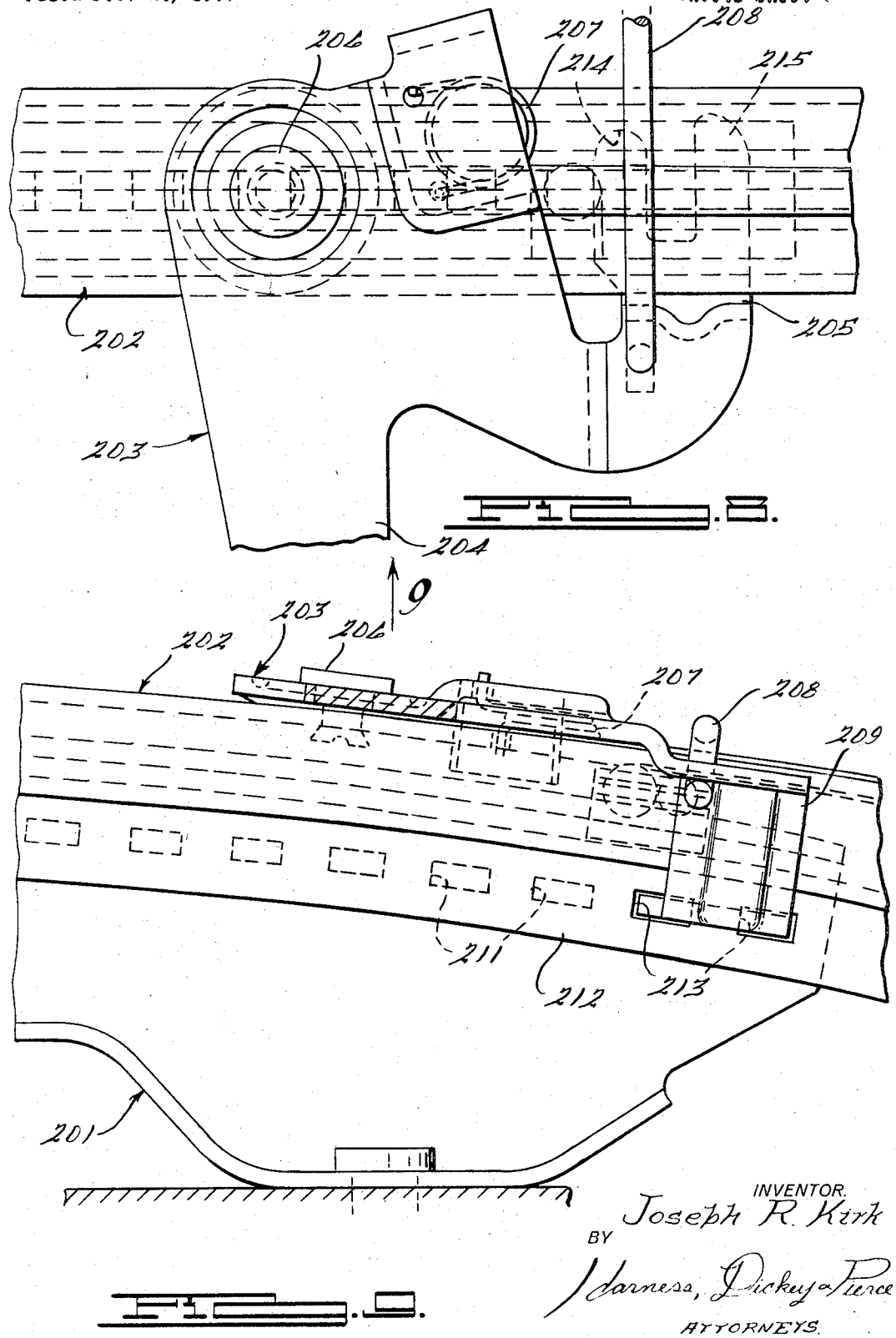

United States Patent Office 3,350,046
Patented Oct. 31, 1967

3,350,046
SEAT SLIDE ASSEMBLY FOR AUTOMOTIVE VEHICLES
Joseph R. Kirk, Jackson, Mich., assignor to Hancock Industries, Inc., Jackson, Mich., a corporation of Michigan
Filed Dec. 28, 1965, Ser. No. 517,049
11 Claims. (Cl. 248—430)

ABSTRACT OF THE DISCLOSURE

An automotive seat slide assembly having a track, a slide, and a latch on the slide movable into apertures in the track and slide to present shear areas preventing their separation.

---

This invention relates to seat slide assemblies for automotive vehicles.

It is an object of the present invention to provide a novel and improved automotive seat slide assembly which has increased strength and is more likely than previous constructions to resist separation in crashes, thus contributing to the safety of the automotive structure.

It is another object to provide an improved automotive seat slide assembly of this character in which the latch contributes to the resistance against separation of the slide and track, and which has no antifriction bearings between the slide and track so located as to facilitate separation thereof during crashes.

It is a further object to provide an improved automotive seat slide assembly having these characteristics, in which the track portion is of increased strength and is integrally connected with its supporting components attached to the floor.

It is another object to provide an improved seat slide assembly of this character in which antifriction elements between the slides and tracks prevent canting of the seat relative to the tracks which could prevent easy adjustment.

It is also an object of the invention to provide an improved automotive seat slide assembly of this character which can be constructed with minimum height, a desirable feature in modern day cars with low roof lines.

It is a further object of the invention, in a modified form thereof, to provide an automotive seat slide assembly having these characteristics, in which the cages between the track and slide for retaining the antifriction elements also serve as resilient means resisting rattling movement of the slides relative to the tracks.

Other objects, features and advantages of the present invention will become apparent from the subsequent description and the appended claims, taken in conjunction with the accompanying drawings, in which:

FIGURE 1 is a side elevational view of an automotive seat slide assembly constructed in accordance with the present invention;

FIGURE 2 is a cross-sectional view in elevation taken along the line 2—2 of FIGURE 1;

FIGURE 3 is a fragmentary cross-sectional view taken along the line 3—3 of FIGURE 2;

FIGURE 4 is a cross-sectional view in elevation taken along the line 4—4 of FIGURE 1;

FIGURE 5 is a fragmentary plan view taken in the direction of the arrows 5—5 of FIGURE 1;

FIGURE 6 is a plan view of a modified form of the antifriction element cage which also acts as a resilient takeup means between the track and slide;

FIGURE 7 is a cross-sectional view taken along the line 7—7 of FIGURE 6 and showing the cage within the space between a slide and track;

FIGURE 8 is a fragmentary plan view of a portion of a modified form of the invention in which the latch is swingably rather than slidably mounted on the slide; and FIGURE 9 is a side elevational view of the construction of FIGURE 8 taken in the direction of the arrow 9 thereof.

Briefly, each of the illustrated embodiments of the invention comprises an elongated track fixed to a vehicle floor and an elongated slide mounted thereon. The track comprises a vertical web portion, a lower horizontal flange secured to the floor, and a pair of upper horizontal flanges extending in opposite directions, one flange being integral with the web and the other being part of an angular member secured to the web. The rear portion of the track has a series of apertures extending through the web and the vertical leg of the angular member. Two such tracks would, of course, be secured to the floor of an automotive vehicle to support a seat.

The slide on each track comprises an upper horizontal web above and facing the upper track flanges, downwardly extending vertical walls, inwardly extending portions at the lower ends of the vertical walls below the track flanges, and downwardly extending vertical portions at the inner ends of the last-mentioned inwardly extending portions. A latch is movably mounted on the rear portion of the slide and is adapted to extend through any of the apertures of the track as well as through a pair of apertures in the lower vertical portion of the slide. Two sets of antifriction elements are provided between the track and slide, each set comprising a roller and a spherical member. These antifriction elements are disposed adjacent the forward and rear ends of the slide assembly between the upwardly facing surfaces of the upper track flanges and the downwardly facing surface of the central slide web.

With this arrangement, at least two shear areas will be presented by the latch to resist upward movement of the rear portion of the slide with respect to the track, such as would tend to occur if the vehicle were suddenly stopped in a crash, especially if the passenger seat belts are attached to the seat frame. The antifriction elements will not tend to cause spreading apart of the slide when it is forced upwardly. The latch apertures will be of increased strength since they are entirely surrounded by metal. Moreover, there will be no rivets between that portion of the track receiving an upward force due to slide lifting, and these portions of the track supported by the floor, these parts being integrally connected, thus further contributing to the strength of the assembly.

In one form of the invention, the latch is slidably mounted for movement transverse to the slide, a pivoted lever connecting the handle with the latch by means of a gear segment and rack arrangement. In another embodiment of the invention, the latch is integrally connected to the handle which is pivoted to the slide. In both these cases, of course, the handle will be accessible from only the driver's side of the seat, the other latch being connected thereto by a link.

In both forms of the invention, resilient means are provided for urging the slide downwardly with respect to the track and resisting upward movement of the slide, thus providing a rattle-free assembly even with relatively liberal dimensional tolerances. In one form of the invention, this resilient means is in the form of a plurality flexible and resilient inserts of low-friction material, such as is disclosed in U.S. Patent No. 3,171,698 issued to Ronald W. Campbell on Mar. 2, 1965. In another form of the invention, the resilient means is combined with the two cages for the sets of antifriction elements between each slide and track. Each cage in this case is made of a low-friction material and not only has an upper horizontal web portion retaining the ball and roller antifriction elements, but downwardly and inwardly extending portions disposed between the track and slide and so formed in their unstressed condition as to create a light but continuous downward force and oppositely directed lateral outward forces on the slide, holding it against the antifriction elements.

Referring more particularly to the drawings, the left-hand seat slide assembly is generally indicated at 11 in FIGURES 1 and 5, the right-hand assembly being indicated at 11' in FIGURE 5. Since both assemblies are quite similar in their construction, except for the shape of the latch elements, the invention will be described with respect to assembly 11. This comprises a track generally indicated at 12 and a slide generally indicated at 13. Track 12 is of elongated shape, having a central vertical web 14, a lower horizontal flange 15 extending in one direction and an upper horizontal track portion in the form of a flange 16 extending in the opposite direction. Fasteners 17 serve to secure track 12 to the floor 18 of an automotive vehicle, these fasteners passing through flange 15.

Upper flange 16 is curved downwardly and rearwardly along its extent, as seen in FIGURE 1, its forward and rear portions being provided with raised elements 19 and 21, respectively, these elements acting as stops for the antifriction elements later described. The track is also provided with an additional member 22 of elongated shape, this member being of angular cross-section and having a vertical portion secured by means such as welding to one side of web 14 and a horizontal portion 23 forming a flange extending in the opposite direction from flange 16. These two flanges are at the same level and both curve downwardly and rearwardly along their extent, a somewhat V-shaped space 24 being formed between flanges 16 and 23 by reason of the fact that the members from which they are formed are bent with a definite radius, as seen in FIGURE 2.

A series of apertured portions 25 are formed in web 14 and the vertical portion of member 22, these apertured portions being toward the rear of track 12. The apertured portions are entirely surrounded by metal and are adapted to receive a latch generally indicated at 26 which is later described in detail.

Slide 13 is of elongated shape and has a generally horizontal upper web portion 27 above flanges 16 and 23, a pair of vertical sides 28 extending downwardly from web 27 past the edges of flanges 16 and 23, a pair of portions 29 extending inwardly from the lower ends of sides 28, and a pair of vertical portions extending downwardly from the inner ends of portions 31, as seen in FIGURE 2. In other words, slide 13 surrounds or encloses flanges 16 and 23 of track 12. Web 27 is spaced above flanges 16 and 23 and portions 29 of the slide are spaced below flanges 16 and 23.

Two sets of antifriction elements are disposed between the slide and track. The front set is generally indicated at 32 in FIGURE 1, while the rear set is indicated at 33. Each set comprises a roller bearing 34 and a ball bearing 35 in tandem relation. The ball bearing has a somewhat larger diameter than the roller bearing and fits in space 24 as well as a groove 36 in web 27 (see FIGURE 4). Ball bearings 35 will resist lateral movement of the slides with respect to the tracks, thus preventing canting of the seat with respect to the tracks. Roller bearings 34 are disposed between the upper surfaces of flanges 16 and 23 of the track, and the undersurface of web 27. The line contact afforded by the roller bearings, combined with the contact between the ball bearings and the slide and track, will provide satisfactory load transfer between the slide and track.

A cage 37 is provided for each set of antifriction elements 32 and 33. In addition, flexible and resilient inserts 38 are disposed between flanges 16 and 23 on the one hand and the adjacent portions of slide 13 on the other hand, as seen in FIGURE 4. These inserts are bowed in their unstressed condition and exert slight downward and outward forces tending to prevent rattling, as described more particularly in the above-mentioned patent. Flanges 16 and 23 are provided with notches 39 for retaining the retaining members 38 in position.

The forward and rear ends of each slide 13 have upwardly extending bolts 41 and 42 respectively, for securing the seat frame (not shown) thereto. It should be noted that a seat belt (also not shown) could be secured to the seat frame or to bolt 42, and the strength advantages of this novel seat slide assembly will therefore be of value in resisting forces exerted by the seat belt on the slide.

Latch 26 is slidably mounted on the inwardly facing side of slide 13 by means of a mounting bracket 43, secured to a downwardly extending portion 31, as seen in FIGURE 2. Latch 26 is of flat shape, being guided for movement transverse to the slide and track by means of a vertical wall 44 on bracket 43 (FIGURE 5) and a pin 45 carried by the bracket, this pin extending through an elongated slot 46 in the latch. One side of latch 26 is provided with rack teeth 47, and a pivoted lever 48 is mounted on bracket 43 on the left-hand slide 13 forwardly of the latch and has gear segment teeth 49 meshing with teeth 47. A plate 50 beneath bracket 43 supports latch 26 and lever 48, pin 45 being secured to this plate. A helical coil tension spring 51 urges lever 48 in a clockwise direction, as seen in FIGURE 5, one end of this spring being secured to lever 48 and the other end to slide 13. A handle 52 extends outwardly from the forward end of lever 48, and a link 53 connects lever 48 with a similar lever 54 in the right-hand slide 13. Lever 54, of course, does not have a forwardly extending portion since it requires no handle.

The outer end 55 of each latch 26 (see FIGURES 2 and 3) is receivable by apertures 25 as well as a pair of aligned apertures 56 in downwardly extending portions 31 of slide 13. It will thus be seen that two shear areas are presented by portion 55 of each latch 26 to resist upward movement of slides 13 with respect to tracks 12. Besides their adjusting function, therefore, latches 26 will thus play an important role in adding to the strength of the seat slide assembly. It should also be observed that since no antifriction bearings such as rollers or balls are disposed between the undersides of flanges 16 and 23 and the inwardly extending portions 29 of the tracks, there will be no tendency to spread the lower slide portions apart when an upward force is exerted on them.

The operation of the seat slide assembly will be apparent from the above description. To adjust the assembly, it is merely necessary to rock handle 52 counter-clockwise in FIGURE 5, withdrawing latches 26 from apertures 25 so that the slides may be adjusted on the tracks. Handle 52 will then be released, permitting latches 26 to enter the apertures 25 with which they are aligned.

In addition to the advantages mentioned above, it should be noted that each track is secured directly to the floor of the vehicle, no rivets being required between the upper portions of the track and the supporting portions. This again will add to the strength of the entire unit, and will permit a lower total height of the assembly.

FIGURES 6 and 7 illustrate a modified form of the cage which also serves the function of inserts 38 of the previous embodiment. Instead of the cage being formed of thin sheet metal, it is formed of a resilient and flexible material such as a plastic known by the trade name Delrin. The cage is indicated generally at 101 in FIGURES 6 and 7 and has an upper web portion 102 with a T-shaped opening 103 adapted to receive a roller bearing 104 and a ball bearing 105. A pair of downwardly extending sides 106 are formed on member 101, and these terminate with inwardly extending lower portions 107. Portions 106, 107 are disposed between flanges 16 and 23 of track 12 and the adjacent portions of slide 13. The unstressed shape of portions 106 and 107 of cage 101 is such that when the cage is placed within the confines of the slide, as shown in FIGURE 7, it will exert slight outward and downward forces on the slide, thus preventing rattling of the slide with respect to the track in the same manner as inserts 38. In the present case, of course, the cage 101 will not be stationarily retained with respect to the track 12, that is, the track will not have recesses equivalent to notches 39 of the previous embodiment.

FIGURES 8 and 9 show still another embodiment of the invention which is similar to that previously described except that the latches have a pivotal instead of a sliding movement, and are directly connected to their actuating means. The track in FIGURES 8 and 9 is indicated generally at 201, and the slide is indicated generally at 202. These have the same cross-sectional shapes as in the other embodiments. The latch member is indicated generally at 203 and comprises a handle portion 204 and a latch portion 205 with a generally bell crank relationship. The juncture of these two portions is pivotally connected at 206 to the top of slide 202, and a spring 207 is connected between member 203 and the slide 202, urging member 203 counterclockwise, as seen in FIGURE 8. A link 208 connects lever 203 on the left-hand side with that (not shown) on the right-hand side, the latter not having an arm 204 since no handle is required.

Portion 205 is connected to the remainder of arm 203 by a vertical portion 209, seen in FIGURE 9. This vertical portion extends downwardly from the main part of lever 203 to the level of apertures 211, which are the equivalent of apertures 25 in the previous embodiment. Downwardly extending portions 212 of slide 202 are provided with apertures 213, equivalent to apertures 56 of the previous embodiment. Latch portion 205 extends from portion 209 toward the apertures, and has a pair of fingers 214 and 215 receivable by adjacent apertures 211. For this purpose, a pair of apertures 213 are provided in each downwardly extending portion 212, as seen in FIGURE 9.

It will be noted that in this embodiment there are a total of eight shear areas on both seat slide assemblies to resist upward movement of the slides with respect to the tracks. That is, each finger 211 and 212 on each latch portion 205 will have two shear areas, for a total of eight. Obviously, the sliding type of latch 26 could also be modified to provide more than the two shear areas shown in FIGURE 2.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an automotive seat slide assembly, an elongated track having a lower portion secured to the vehicle floor, a central portion extending upwardly from said lower portion, and a track portion extending laterally from the upper end of said central portion, an elongated slide having a central web portion above the track portion of said track, a pair of sides extending downwardly from said central portion past the track portion of said track, and lower portions extending downwardly from said sides alongside the central portion of said track, a plurality of apertured portions in the central portion of said track, toward the rear end thereof, each of said apertured portions being entirely surrounded by the material constituting said central track portion, a latch mounted on said slide for lateral movement with respect thereto between latching and unlatching positions, and a pair of apertured portions in and entirely surrounded by the material constituting the lower portions of said slide, said last-mentioned apertured portions being aligned with each other and with the movement of said latch between its two positions, and further being at the same level as said track apertured portions with the lower ends of said slide apertured portions being closely adjacent the underside of said latch and the upper ends of said track apertured portions being closely adjacent the top of said latch, whereby said latch may be received by said slide apertured portions and any track apertured portion with which said slide apertured portions are aligned, and when so received will present two shear areas between said lower slide portions and said central track portion to resist upward movement of said slide with respect to said track.

2. The combination according to claim 1, the track portion of said track comprising a first flange integral with the central track portion and extending laterally in one direction therefrom, an angular member having one leg secured to said central track portion and a second leg constituting a flange aligned with said first flange but extending in the opposite direction, the inner edges of said flanges being formed with a radius so as to provide an upwardly open recess between the flanges, and antifriction means between said slide and track, said antifriction means comprising at least two sets of antifriction members, each set having a roller bearing and a ball bearing between said central slide web and said flanges, the central slide web having a downwardly open groove aligned with said upwardly open recess so that said ball bearings are held therebetween.

3. The combination according to claim 2, said slide further having inwardly extending portions between said sides and said downwardly extending portions, and insert members between said flanges and the sides and inwardly extending portions of said slides, each of said insert members comprising an elongated member of low-friction, resilient and flexible material having a bowed shape in its unstressed condition, whereby said insert members will exert slight downward and outward forces on said slide.

4. The combination according to claim 2, said slide further having inwardly extending portions between said sides and downwardly extending portions, and a cage for each of said sets of antifriction members, each cage having a central portion between the slide web and track flanges for retaining said antifriction members, and downwardly and inwardly extending portions between said slide and track, each cage being fabricated of low-friction material with flexible and resilient properties, and having in its unstressed condition a shape such that when disposed between said track and slide, it will exert slight downward and outward forces on said slide.

5. The combination according to claim 1, further provided with a bracket secured to said slide and slidably supporting said latch for movement between its latching and unlatching positions.

6. The combination according to claim 5, said bracket having a plate secured in spaced relation therewith, said latch being slidably mounted between said bracket and plate, a pin extending between the bracket and plate, and an elongated slot in said latch within which said pin is disposed.

7. The combination according to claim 6, further provided with an actuating lever pivotally mounted on said slide, meshing gear segment and rack teeth on said actuating lever and latch respectively, whereby rocking of said actuating lever will cause sliding movement of said latch, and spring means urging said actuating lever and latch toward its latching position.

8. The combination according to claim 1, said latch having a plurality of projections spaced apart the same distance as said track apertured portions, and apertured portions in said lower slide portions to accommodate said latch projections, whereby said latch will be disposed within two track apertured portions and two sets of slide apertured portions when in its latching position.

9. The combination according to claim 8, said latch being pivotally mounted on the web portion of said slide portion, said latch projections being substantially below the level of said slide web portion, a downwardly extending portion on said latch connecting the mounted portion thereof with said projections and a spring connected between said latch and slide and urging the latch toward its latching position.

10. In an automotive seat slide assembly, an elongated track having a lower portion secured to the vehicle floor and a portion extending upwardly from said lower portion, an elongated slide having a central web portion above said track, a pair of sides extending downwardly from said central portion past the upper portion of said track, and portions extending inwardly from the lower ends of said sides toward said track, a plurality of apertured portions in the upwardly extending portion of said track toward the rear end thereof, each of said apertured portions being entirely surrounded by the material constituting said upwardly extending track portion, a latch mounted on said slide adjacent one side thereof for lateral movement with respect thereto between latching and unlatching positions, and an apertured portion in and entirely surrounded by the material constituting said one side of said slide, said slide apertured portion being at the same level as said track apertured portions with the lower end of said slide apertured portion being closely adjacent the underside of said latch and the upper ends of said track apertured portions being closely adjacent the top of said latch, whereby said latch may be received by said slide apertured portion and any track apertured portion with which said slide apertured portion is aligned, and when so received will present a shear area between said one side of the slide and the upwardly extending portion of said track to resist upward movement of said slide with respect to said track.

11. The combination according to claim 10, further provided with a pair of flanges extending outwardly in opposite directions from the upper portion of said track, said last-mentioned flanges being above said inwardly extending portions on the slide, an additional downwardly extending portion carried by said slide on the side of said upwardly extending track portion opposite said one side of the slide which has an apertured portion, said additional downwardly extending element on the slide having an apertured portion which is aligned with the apertured portion in said one side and with the movement of said latch between its two positions, said latch being of sufficient length to enter said last-mentioned apertured portion when in its latching position.

References Cited

UNITED STATES PATENTS

| | | | |
|---|---|---|---|
| 2,139,174 | 12/1938 | Saunders | 248—430 |
| 2,271,913 | 2/1942 | Crabb | 248—430 |
| 3,120,371 | 2/1964 | Dall | 248—430 X |
| 3,171,698 | 3/1965 | Campbell | 308—3.8 |
| 3,207,554 | 9/1965 | Dall | 297—385 |
| 3,279,737 | 10/1966 | Krause | 248—430 |

FOREIGN PATENTS

| | | |
|---|---|---|
| 1,349,006 | 12/1963 | France. |
| 1,037,878 | 8/1958 | Germany. |

ROY D. FRAZIER, *Primary Examiner.*

R. P. SEITTER, *Assistant Examiner.*